United States Patent [19]

Ouchi et al.

[11] Patent Number: 4,853,495

[45] Date of Patent: Aug. 1, 1989

[54] ELECTRONIC BLACKBOARD AND ELECTRONIC BLACKBOARD SYSTEM

[75] Inventors: Tomonori Ouchi; Otsuro Wakamatsu; Hiroshi Kawanishi; Masao Yasui, all of Kyobashi, Japan

[73] Assignee: Shimizu Construction Co., Ltd., Tokyo, Japan

[21] Appl. No.: 209,824

[22] Filed: Jun. 22, 1988

[30] Foreign Application Priority Data

Jun. 24, 1987 [JP] Japan .................................. 62-157384

[51] Int. Cl.[4] .............................................. G08C 21/00
[52] U.S. Cl. ....................................... 178/18; 434/108; 235/375
[58] Field of Search ..................... 178/18, 19; 434/108; 235/375, 435, 376, 377, 441, 492, 385

[56] References Cited

U.S. PATENT DOCUMENTS 4,711,977  12/1987  Miyamori et al. ..................... 178/18

Primary Examiner—Stafford D. Schreyer
Attorney, Agent, or Firm—Armstrong, Nikaido Marmelstein Kobovcik & Murray

[57] ABSTRACT

An electronic blackboard wherein a multiplicity of heads for reading and writing storage data in relation to memories are disposed lengthwise and breadthwise on the surface of a board so that data can be read from and written into the memories on the board surface. Also disclosed is an electronic blackboard system which comprises input/output control means for controlling a storage data input/output operation in which heads which are disposed on the surface of a board are sequentially scanned to read or write storage data and data processing means for processing storage data, whereby storage data relative to a memory which is stuck on the board surface is read or written with a predetermined relationship between the head position and the storage data. By virtue of the above-described aggangement, when a memory is stuck on the board surface, storage data is read from or written into the memory by means of the corresponding head through the input/output control means, and the read/write data is processed in the data processing means. Accordingy, it is possible to store data into memories on the board, read the data from the memories, and process data corresponding to the position of each memory stuck to the board surface.

5 Claims, 5 Drawing Sheets

ELECTRONIC BLACKBOARD AND ELECTRONIC BLACKBOARD SYSTEM

BACKGROUND OF THE INVENTION

The present invention relates to an electronic blackboard which is designed so that desired storage data can be read from and written into a memory on the surface of a board. The present invention also pertains to an electronic blackboard system employing the above-described electronic blackboard.

As a result of the progress of office automation, various kinds of office automation equipment have been developed, and office work and business administration have been increasingly streamlined by making use of these office automation equipments. Among them are systems which are known as electronic meeting systems. One type of conventional electronic meeting system is arranged such that information which is written on a white board during a meeting is converted into an electric signal, or the content of a meeting is converted into a video signal, and these signals are transmitted through communication lines, thereby enabling meetings to proceed simultaneously at different places, or permitting the content of the meeting to be instantaneously transmitted to another place. In the conventional system that employs a white board, a coordinate detecting function is imparted to the white board, so that, when information concerning the content of a meeting is written on the white board with a specified writing implement, for example, a pen or the like, the written information is detected as coordinate data and converted into an electric signal.

To prepare a process control chart, it is general practice to make a schedule of work using a piece of paper having a standard size of A1 (594×841 mm). However, since the number of activities which can be computed by a manual operation is about 500, if the number of activities exceeds it, a computer must be utilized. In such a case also, it is conventional practice to first prepare a draft using a sheet of paper of A1-size and then input data by means of an input sheet or an input screen.

Since in the electronic meeting system of the type described above the content or state of a meeting written on the white board is merely converted into an electric signal, each piece of information which needs to be transmitted must be input onto the white board on each occasion. To move or copy the information written on the white board to another position thereon to correct or alter the written information, it is necessary to erase unnecessary items and insert new items to the information a plurality of times. Even a predetermined item must be written every time it needs to be input.

Accordingly, in either case where the content of a meeting is input and processed as data by the use of a white board or a process control chart is prepared using a white board, all the necessary information must be written on the white board, and the necessity of inputting (e.g., writing) the required information leads to a lowering in the working or meeting efficiency.

The conventional electronic blackboard also suffers from the disadvantage that it merely reads characters or line drawings drawn on a blackboard as information in the form of images and is incapable of directly processing numerals written thereon as being data for a computer.

It is generally a important matter of control to process daily reports at a construction site or the like, and various kinds of system have been developed to facilitate such administrative processing and save the labor consumed therein. However, conventional computerized daily report processing has the problem that, since daily reports are handled as input data, a troublesome manual operation is needed to input data using a keyboard and a great deal of time and labor are needed to present (manually) and collect daily reports. If the data processing system is not abundant in equipment, the input time may overlap that for another system, for example, the cost control. Since the operator must refer to a code table or the like when inputting data, a great deal of time and labor is needed to input data. In addition; in many cases, descriptions of the contents of daily reports for subcontractors are unclear and lack unity, so that it is impossible to grasp the daily records of work at once and it takes time and labor to prepare a monthly collective chart.

SUMMARY OF THE INVENTION

The present invention aims at solving the above-described problems of the prior art, and it is an object of the present invention to provide an electronic blackboard which is designed so that it is possible to readily input predetermined information and also a system employing this electronic blackboard.

It is another object of the present invention to provide a system which is suitable for inputting data concerning process control and daily reports.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To attain the above described objects, the present invention provides an electronic blackboard designed to enable storage data to be read from and written into memories on the surface of a board, wherein a multiplicity of heads for reading and writing storage data in relation to the memories are disposed lengthwise and breadthwise on the surface of the board. The present invention also provides a system employing the above-described electronic blackboard which comprises input-/output control means for controlling a storage data input/output operation in which the heads disposed on the board surface are sequentially scanned to read or write storage data and data processing means for processing storage data, whereby storage data relative to a memory which is stuck to the board surface is read or written with a predetermined relationship between the head position and the storage data.

By virtue of the above-described arrangement, when a memory is stuck to the board surface, storage data is read from or written into the memory by means of the corresponding head through the input/output control means, and the read/write data is processed in the data processing means. Accordingly, if memories stored with predetermined information are prepared and each memory is stucked to a specific position on the board surface as occasion demands, the content of the memory is recognized as information corresponding to the specific position and appropriately processed in the data processing means. If a memory is stuck to a specific position on the board surface and information corresponding to the position of the stuck memory is written into the memory from the data processing means and then the data stored in the memory is read and input to another device, it is possible to recognize and process the data written on the board surface in another data processing section.

DESCRIPTION OF PREFERRED EMBODIMENTS

One embodiment of the present invention will be described hereinunder with reference to the accompanying drawings.

Figures 1, 2:
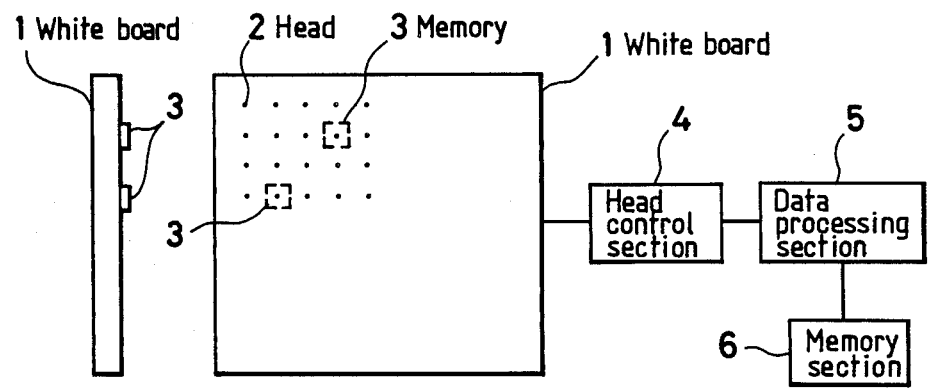
FIG. 1 shows the arrangement of one embodiment of the electronic blackboard system according to the present invention.
FIG. 2 shows one example of application of the electronic blackboard system according to the present invention.

Referring first to FIG. 1, the reference numeral 1 denotes a white board, 2 heads, 3 memories, 4 a head control section, 5 a data processing section, and 6 a memory section. The white board 1 has a multiplicity of heads 2 disposed thereon lengthwise and breadthwise. Each head 2 is capable of reading and writing storage data in relation to a memory 3 as occasion demands. The head control section 4 controls the interface between the heads 2 and the data processing section 5. For example, the head control section 4 parallel processes storage data respectively read or written by the heads 2, and executes serial transfer of storage data between the same and the data processing section 5, or sequentially scans the heads 2 and, while doing so, it reads or writes storage data. The data processing section 5 has input means, for example, a keyboard for inputting storage data to be written, control commands, etc., and output means, for example, a display, printer and the like for outputting input data, readout data, processed readout data, etc., and processes storage data which has been read and storage data which is to be written. The memory section 6 is employed as a file for holding storage data which is to be written and as a file for holding readout data and processed readout data.

Accordingly, the heads 2 have respective addresses and storage data is managed for each address in the data processing section 5, whereby the correspondence is found between storage data and the position thereof on the white board 1. The arrangement may also be such that an input menu for the operation of inputting data from the input means is stored in the memory section 6 in advance, and when the system is run in the input mode, a menu for guiding and instructing the input procedure and format is displayed. By doing so, it is possible to provide a system which can be readily operated by even an operator who is unfamiliar with the system.

In such an electronic blackboard system, the memories 3 are small-sized memories formed in the shape of, for example, plastic chips, and designed so as to be stuck to the surface of the white board 1. The memories 3 may be arranged such that it is possible to color their surfaces or write simple characters thereon so that information can be indicated. If the entire surface of the white board 1 is covered with a film such that the heads 2 are protected to enable information to be written on the board surface with a writing implement such as a pen and also erased therefrom as desired, the white board 1 can also serve as a conventional blackboard or a display board and it is also possible to give the memories 3 not only storage information but also indicative information. More specifically, it is possible to use both the indication on the white board 1 and the indication on the output means (display) in the data processing section 5.

FIG. 2 shows one example of application of the above-described electronic blackboard. In the example shown in FIG. 2, the electronic blackboard is used as an present work condition display board. More specifically, the board surface is divided into three regions, i.e., "Name of work", "Place" and "Disposition of workmen", and each region is further divided into columns for detailed items. Specific regions in the respective columns are spared so as to be used as memory sticking regions. Accordingly, in the data processing section, the display sections and the memory sticking regions are recognized in correspondence with the addresses of the heads.

Therefore, if "Concrete placing for side wall" is written in the region of "Name of work" and then a memory stored with "Concrete placing for side wall" as a work name is stuck behind the entry, the storage data, i.e., "Concrete placing for side wall", is recognized as information belonging to the region of "Name of work" in the data processing section on the basis of the address of the head reading the memory information. More specifically, by writing "Concrete placing for side wall" as an indication on the display board and then sticking a memory stored with the corresponding information behind the indication, this information is input to the data processing section. In the region of "Disposition of workmen" which is behind the indication of "Concrete placing for side wall", each workman arriving at the office sticks his personal memory stored with the name of the company to which he belongs and his personal information in a column corresponding to his work and a particular place of work. Receiving the information concerning the stuck memory, the data processing section recognizes from the address of the head which reads the memory information that the position of the stuck memory is within the region of "Disposition of workmen" and the memory position corresponds to "Concrete placing for side wall" in the region of "Name of work" and to "Side wall A4" in the region of "Place".

The arrangement may be such that the data processing section does not particularly recognize the regions of "Name of work", "Place" and "Disposition of workmen" in the way described above but recognizes these regions from the information concerning the memories stuck in the respective regions. For example, it is possible to judge whether each particular memory stuck on the board is a memory for a name of work, a place or a workman from the information stored in the memory and recognize a relationship between a name of work, a place and a workman from the respective positions of the stuck memories.

In this way, it is possible with the present work condition display board shown in FIG. 2 to recognize the disposition of workmen for each work and each place from the information read from each head, and by processing the obtained information, it is possible to output collective and statistical data. Moreover, each workman can readily input his personal data simply by sticking his personal memory within a predetermined region. Thus, it is possible to indicate on the white board who is doing what work at where at the site of work and it is also possible to display or print out the present work condition in the data processing section. Therefore, it is possible to grasp at a glance the present work condition at the site. At the same time, it is also possible to readily transfer data to a computer that executes data collecting processing or payment processing, and therefore it is possible to save time and labor which would otherwise be needed to input handwritten daily reports through a keyboard.

In the case of construction work, for example, it is a daily occurrence that the place of work of each workman and the contents of work change every day, and therefore the place of work and the contents of work cannot be handled as data peculiar to each individual workman. More specifically, it is impossible to register information concerning the place of work and the contents of work as predetermined data in a medium, for example, a magnetic card or the like, together with the name and address of an individual, the name of the company or other information. However, information concerning the place of work and the contents of work are important data in processing of daily reports. Accordingly, there is a need for a device which enables these data to be changed every day as desired. Since the present invention enables data concerning the place of work and the contents of work to be input simultaneously with data peculiar to each individual simply by replacing memories, it is possible to satisfactorily meet the above-described demands. Further, the board permits characters and figures to be written thereon in the same way as in the case of conventional white boards and therefore it is also possible to display data input conditions with ease.

Figure 3:
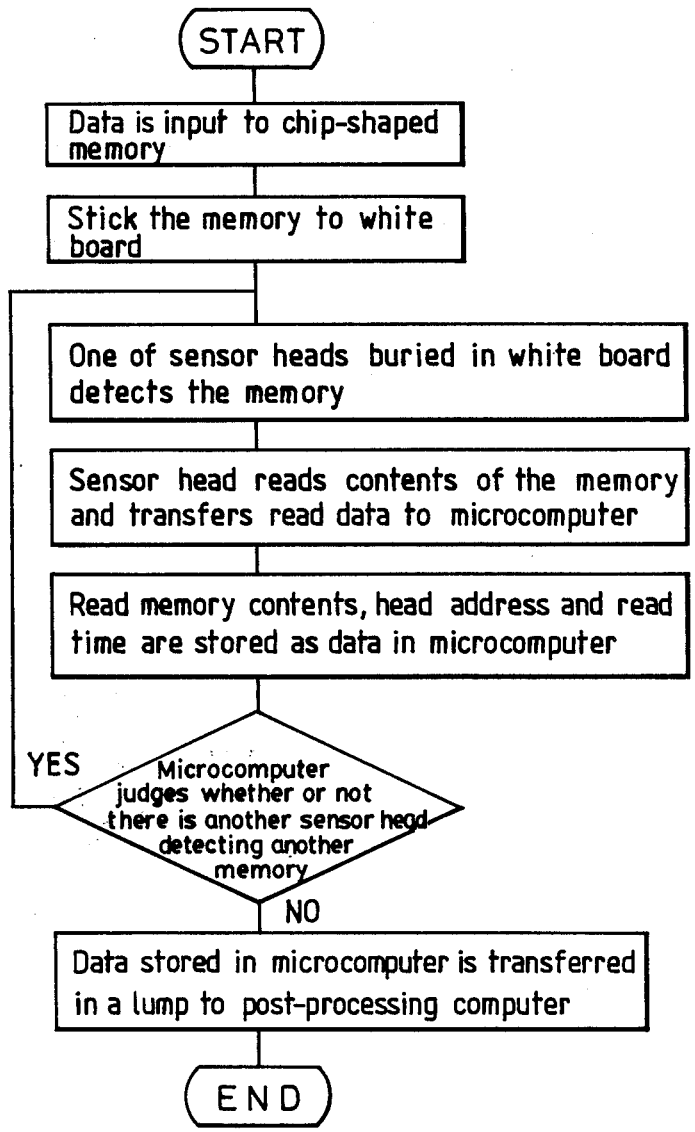
FIG. 3 shows the flow of processing carried out by the electronic blackboard system according to the present invention.

FIG. 3 is flowchart showing the general processing executed in the above-described electronic blackboard system. As shown in FIG. 3, pieces of data concerning the name of work, the place of work and each individual workman are first input into chip-shaped memories, respectively, in the case of the system shown in FIG. 2, and the memories are stuck in predetermined regions, respectively, on the white board.

On the other hand, the sensor heads which are buried in the white board are scanned at a predetermined scanning period (i.e., every predetermined time) to detect whether or not a memory is present on the white board. If the presence of a memory is detected the corresponding head reads the storage data from the memory and transfers the read data to the data processing section through the memory control section. The data processing section stores the storage data thus read out in the memory section, together with the address of the corresponding head and the read time. Data thus stored is transferred in a lump to a post-processing computer where data processing is executed. If the arrangement is such that each workman sticks his personal memory to the white board when he arrives at the office and removes it when he leaves the office, it is possible to automate the management of attendance and absence of each individual workman and the management of working hours by filing in the data processing section the times at which a change occurs on the white board, i.e., the time at which a memory is stuck thereto and the time at which the memory is removed therefrom, as historical data together with the storage data concerning the memory stuck in the region of "Disposition of workmen".

Thus, the electronic blackboard system according to the present invention enables information to be simultaneously displayed on the board and input to a computer that executes data collecting processing and therefore the arrangement of the present invention may be effectively applied to display boards for displaying information which needs not only to be put up thereon but also to be subjected to processing thereafter, such as collection and classification of the displayed information, e.g., a display board for displaying conditions of attendance and absence of workers or indicating how many men are working in a mine, a business performance graph, or a display board for indicating how machines or facilities are being used. Moreover, the electronic blackboard system of the present invention can be used in the same manner and with the same feeling as in the case of conventional white board, and it enables necessary data to be input to a computer without using a keyboard. Accordingly, the system can be easily used to input data by even a person who is unfamiliar with computers.

One example in which the electronic blackboard according to the present invention is applied to a process control system will next be described with reference to FIG. 4.

In preparation of a schedule of work, the number of activities which can be computed by a manual operation is about 500 and, if the number of activities exceeds it, a computer must be utilized. In preparation of a construction schedule using a computer, it is conventional practice to first make a draft using a sheet of paper and then input data by means of an input sheet or an input screen. Accordingly, it has heretofore been impossible to easily and freely change or correct the completed construction schedule. In contrast, the electronic blackboard system according to the present invention enables a construction schedule to be readily prepared and changed as desired, as described below in detail.

Figure 4:
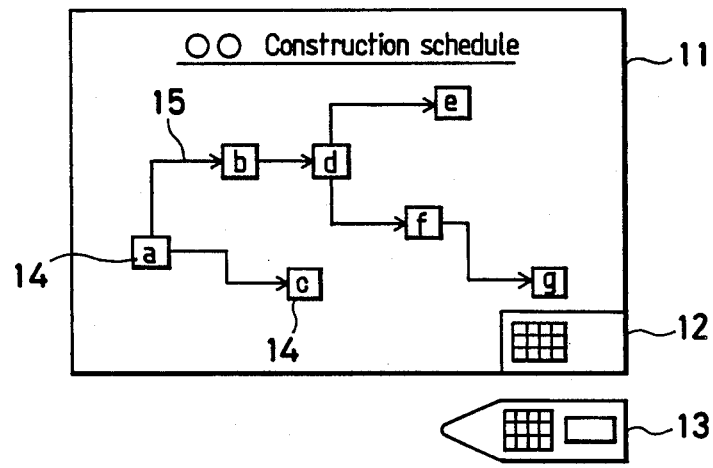
FIG. 4 shows one example in which the electronic blackboard according to the present invention is applied to a process control system.

As shown in FIG. 4, the process control system comprises an electronic blackboard 11 wherein a multiplicity of heads for reading and writing information in relation to memories are buried in the surface of a board, a data processing unit 12 for controlling the operation of reading and writing storage data in relation to the memories on the board surface through the heads, and a handy reader-writer 13, for example, a pencil-type reader-writer 13, which is capable of reading and writing storage data in relation to each individual memory. In this example, the data processing unit 12 is integrally incorporated in the right bottom part of the electronic board 11, and keys and a display which are used to input data are disposed on the front side of the data processing unit 12. The reader-writer 13 has keys for inputting storage data, a display by which it is possible to confirm input data and readout data, and a memory for temporarily holding readout data. Memories 14 which are stuck to the surface of the board are employed as nodes for process control and adapted to store a node identification, the number of days for each work, link information between each pair of adjacent nodes, etc.

Figure 5:
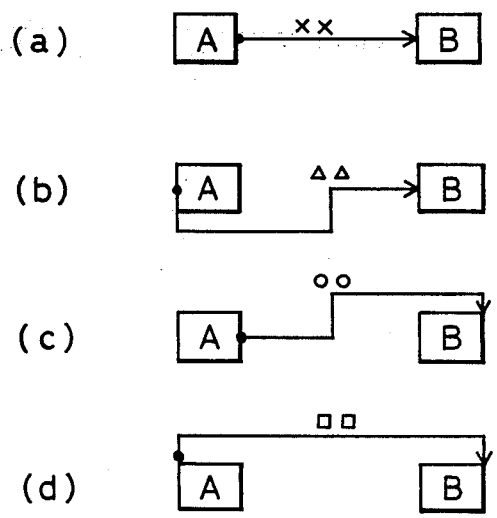
FIG. 5 shows examples of link information between nodes.

The following is description of the procedure of preparing a construction schedule by the use of the above-described system. In preparation of a construction schedule, a network is first formed on the electronic blackboard 11 and then memories 14 are stuck on nodes a to g, respectively, thus completing a construction schedule on which the nodes a to g are linked together as illustrated. Upon completion of the construction schedule on the electronic blackboard 11 in this way, node information is written into each of the memories 14 respectively corresponding to the nodes a to g with the reader-writer 13. Although link information lines 15 are also written on the electronic blackboard 11, they are not read into the data processing unit 12; therefore, information concerning the connection between each pair of adjacent nodes is also written into the corresponding memory. After the construction schedule has been completed in this way, information stored in the memory on each node is read and input to the data processing unit 12 from the corresponding head on the electronic blackboard 11. Then, the read information may be transferred to, for example, a general-purpose computer having a program for preparing a construction schedule on the basis of information stored in the memory on each node, thereby preparing and printing out a construction schedule. FIG. 5 shows examples of link information between each pair of adjacent nodes.

FIG. 5(a) shows N-type link information which indicates that the node B can be commenced xx days after the completion of the node A (end→start). FIG. 5(b) shows S-type link information which indicates that the node B can be commenced ΔΔ days after the commencement of the node A (start→start). FIG. 5(c) shows F-type link information which indicates that the node B can be completed 00 days after the completion of the node A (end→end). FIG. 5(d) shows E-type link information which indicates that the node B can be completed ☐☐ days after the commencement of the node A (start→end).

Information concerning connection between each pair of adjacent nodes is set with the reader-writer 13. For example, when the node b to which the node a is connected is to be written as connection information into the memory on the node a, the identification of the node b is first read and held with the reader-writer 13 and this identification is then written as connection information into the memory on the node a. By doing so, it is possible to set connection information by such a simple operation that the node identification is read from a memory on one node and the read identification is written into a memory on another node, without taking care of each node on each occasion.

The following is a description of one example of processing executed according to the construction schedule preparing program.

Namely, a construction schedule is prepared according to a construction schedule preparing program, as described above, and the processing therefor is executed according to the following procedure by way of example:

1 First, a top node, that is, a node having no link information concerning a node which is forward of it, is searched.

2 Next, a final node, that is, a node having no link information concerning a node which is rearward of it, is searched.

3 A node which contains link information is searched from the node next to the top node.

4 The processing 3 successively repeated to the final node to calculate a number of days required to complete a particular work.

5 Layout is arranged on the basis of the Y-coordinates and the date of commencement of the construction and holidays are adjusted to prepare a chart.

Figure 6A:
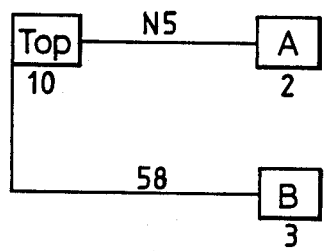
FIGS. 6a and 6b show one example of a processing executed according to a program for constructing a schedule of work.
Figure 6B:
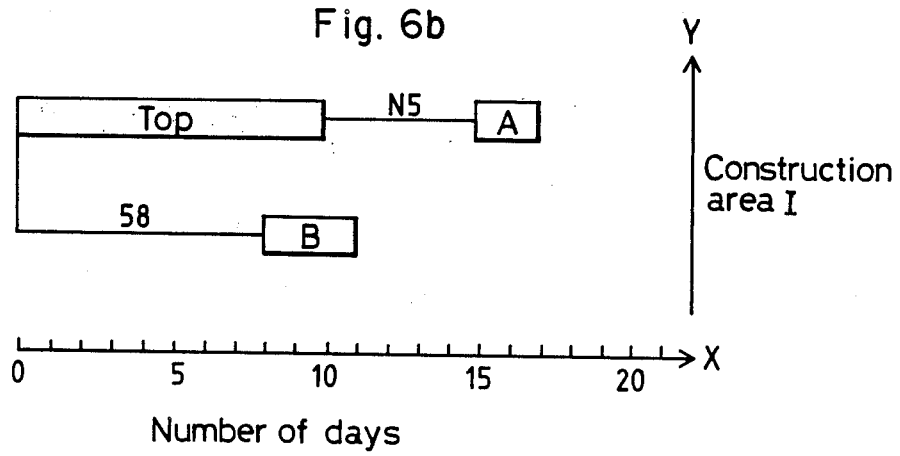

For example, FIG. 6(a) shows that the node A is commenced 5 days after the completion of the top node and completed in 2 days, while the node B is commenced 8 days after the commencement of the top node and completed in 3 days. It should be noted that the number of days for the top node is 10. In the case of this example, if the number of days is plotted along the abscissa axis (X) and the construction area along the ordinate axis (Y), Y-coordinates are determined by making the nodes correspond to the respective construction areas, and a chart is drawn from the top node according to the construction area and the number of days. Thus, it is possible to prepare a construction schedule such as that shown in FIG. 6(b).

With this construction schedule preparing system, a process control chart is prepared on the board by means of memories stored with node information, and the storage information is read out and processed to output a schedule of work. Therefore, it is possible to plan a network as desired on the board and input data using the chart prepared on the board. Since a change of the network can be executed on the board, it is possible to make use of the sense of sight and utilize the system without the need to take care of the computer. Further, since it is possible to readily make a change and collection and read out the result of the change or correction by read means through a plurality of heads, the process control chart prepared on the board surface can be automatically input to data processing means. In addition, since a process control chart is produced in the data processing means on the basis of the node information, it is possible to obtain a rearranged process control chart from output means even if the process control chart on the board is deformed as a result of repeated change and correction.

One example in which the electronic blackboard according to the present invention is applied to a daily report data inputting and processing system will next be described with reference to FIG. 7. In the figure, the reference numeral 21 denotes a work item board, 22 memories, 23 a head control section, 24 a data processing section, 25 a reader-writer, 26 a scanner, 27 an adapter, and 28 a general-purpose personal computer.

Figure 7A:
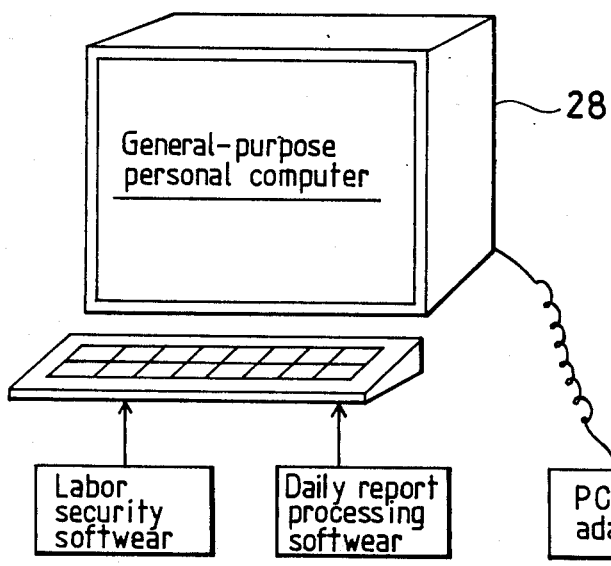
FIGS. 7a and 7b show one example in which the electronic blackboard according to the present invention is applied to a daily report data inputting and processing system.
Figure 7A:
Figure 7B:
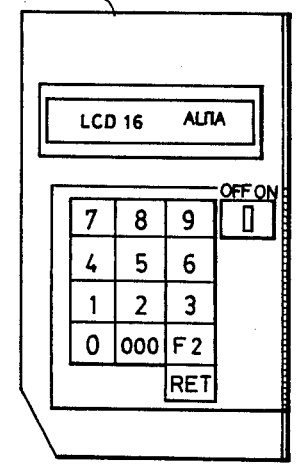

Referring to FIG. 7, the work item board 21 is an electronic blackboard comprising a board and a multiplicity of heads which are capable of reading and writing storage data in relation to memories, the heads being buried in the surface of the board lengthwise and breadthwise. The surface of the board 21 is provided with columns for "Contractors", "Type of job" and "Work items", respectively, and memories 22 are stuck in the respective columns. The head control section 23 controls the operation of reading and writing data in relation to a plurality of heads, while the data processing section 24 processes readout data and data which is to be written. The reader-writer 25 is capable of reading and writing storage data in relation to the memories 22 independently of the heads buried in the work item board 21.

Thus, in the example shown in FIG. 7(*a*), daily report data is input by making use of the electronic board (work item board 21) of the present invention in such a manner that memories 22 each stored with a contracter's name, type of job or work item are stuck in the corresponding regions and actual man hours and other data are additionally input to the memories 22 with the reader-writer 25 as occasion demands. Finally, the storage data of the memories 22 is read through the head control section 23 and input to the data processing section 24, thereby reading daily report data.

FIG. 7(*b*) shows another example in which a scanner 26 is used in place of the reader-writer 25 and the system is arranged such that the scanner 26 can be connected to a general-purpose personal computer 28 through an adapter 27. In this case, the storage data of the memories 22 stuck on the work item board 21 is read with the scanner 26. In use, for example, information concerning the work to be done on a particular day and other information are input to the scanner 26 from the work item board 21 in the morning, and the scanner 26 is put in a foreman's keeping. During work, every time a planned work is completed, the foreman inputs actual man hours, and in the evening the foreman transfers the data from the scanner 26 to the general-purpose personal computer 28 by the use of the adapter 27. As the work item board 21 in this case, an electronic blackboard having heads buried therein does not necessarily need to be used, and it is possible to employ an ordinary display board.

It should be noted that the present invention is not necessarily limited to the above-described embodiments and various changes and modifications may be imparted thereto. For example, although in the foregoing embodiments heads which are buried in a white board are used to both read and write storage data in relation to memories, it is also possible to employ a write-only device for writing data into the memories and use the heads on the board for a read operation only. Further, time information may also be taken into the computer when the readout data is input thereto.

The present invention may be widely used in factories and offices in addition to construction sites such as that described above. For example, the present invention may, of course, be applied to the following conventional systems: a system in which information handwritten on slips such as delivery slips and sales slips is input through a keyboard; a system in which codes representing the name of work, name of parts, name of product, etc. are input through a keyboard; and an arrangement in which information concerning a plurality of systems is processed by a single computer.

As will be clear from the foregoing description, according to the present invention, memories stored with predetermined information are prepared and each memory is stuck to a specific position on the surface of a board and removed therefrom as occasion demands, whereby information corresponding to the specific position on the board surface can be processed by data processing means. It is also possible to allow data written on the board surface to be recognized and processed in another data processing section by sticking a memory to a specific position on the board surface, writing information corresponding to the specific position into the memory from the data processing means, and reading the storage data from the memory using another device. Thus, the data inputting operation using an electronic blackboard is simplified by a large margin as compared with the prior art, and it is therefore possible to save labor in the data inputting operation.

What we claim is:

1. An electronic blackboard designed to enable storage data to be read from and written into memories on the surface of a board, comprising a multiplicity of heads for reading and writing storage data in relation to the memories, said heads being disposed lengthwise and breadthwise on the board surface.

2. An electronic blackboard system that employs an electronic blackboard in which a multiplicity of heads for reading and writing storage data in relation to memories are disposed lengthwise and breadthwise on the surface of a board, said system comprising input/output control means for controlling a storage data input/output operation in which said heads disposed on the board surface are sequentially scanned to read or write storage data, and data processing means for processing storage data, whereby storage data relative to a memory which is stuck to the board surface is read or written with a predetermined relationship between the head position and the storage data.

3. An electronic blackboard system according to claim 2, further comprising read/write means which is capable of reading and writing storage data in relation to the memories independently of the heads disposed on the board surface.

4. An electronic blackboard system according to claim 2, wherein each of said memories stores node information concerning a process, while said data processing means prepares a process control chart on the basis of the node information read out from the memories.

5. An electronic blackboard system according to claim 4, wherein said node information includes node identifying information and link information.

* * * * *